(12) United States Patent
Rehm et al.

(10) Patent No.: US 10,913,012 B2
(45) Date of Patent: *Feb. 9, 2021

(54) THREE-PHASE SEPARATION OF HYDROCARBON CONTAINING FLUIDS

(71) Applicant: John Zink Company, LLC, Tulsa, OK (US)

(72) Inventors: Stephen Rehm, Tulsa, OK (US); Timothy Oneal, Tulsa, OK (US); Gene Bittel, Tulsa, OK (US); Mark Ferguson, Tulsa, OK (US); Daniel Wright, Tulsa, OK (US); Nicholas Jensen, Tulsa, OK (US); Todd Earls, Tulsa, OK (US)

(73) Assignee: John Zink Company, LLC, Tulsa, OK (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/124,293

(22) Filed: Sep. 7, 2018

(65) Prior Publication Data

US 2019/0078028 A1 Mar. 14, 2019

Related U.S. Application Data

(60) Provisional application No. 62/557,510, filed on Sep. 12, 2017.

(51) Int. Cl.
*B01D 17/02* (2006.01)
*B01D 19/00* (2006.01)
*C10G 53/02* (2006.01)
*B01D 17/04* (2006.01)
(Continued)

(52) U.S. Cl.
CPC ........... *B01D 17/02* (2013.01); *B01D 1/0041* (2013.01); *B01D 17/0214* (2013.01); *B01D 17/042* (2013.01); *B01D 17/12* (2013.01); *B01D 19/0036* (2013.01); *B01D 19/0042* (2013.01); *B01D 19/0063* (2013.01);
(Continued)

(58) Field of Classification Search
None
See application file for complete search history.

(56) References Cited

U.S. PATENT DOCUMENTS 5,302,294 A * 4/1994 Schubert ................ B01D 17/02
210/702
7,740,691 B2 6/2010 Cash
(Continued)

FOREIGN PATENT DOCUMENTS

WO 2005094961 A1 10/2005

OTHER PUBLICATIONS

Sivalls, C., Oil and Gas Separation Design Manual, 2009, available at: https://pacs.ou.edu/media/filer_public/c9/4a/c94a97ac-9609-4262-ab06-b7b2dda1c4fa/3_oil_and_gas_separation_design_manual_by_c_richard_sivalls.pdf . (Year: 2009).*

*Primary Examiner* — Derek N Mueller (57) ABSTRACT

Systems and methods for separation of hydrocarbon containing fluids are provided. More particularly, the disclosure is relevant to separating fluids having a gas phase, a hydrocarbon liquid phase, and an aqueous liquid phase using indirect heating. In general, the system uses a first gas separation followed by pressure reduction and then a second gas separation. Indirect follows the second gas separation and then three-phase separation.

13 Claims, 7 Drawing Sheets

(51) Int. Cl.
B01D 17/12 (2006.01)
B01D 1/00 (2006.01)
(52) U.S. Cl.
CPC ..... B01D 19/0068 (2013.01); B01D 19/0073 (2013.01); C10G 53/02 (2013.01); *C10G 2300/4012* (2013.01)

(56) References Cited

U.S. PATENT DOCUMENTS 8,491,796 B2 7/2013 Perez-Cordova
9,630,126 B1 4/2017 Ball \* cited by examiner

THREE-PHASE SEPARATION OF HYDROCARBON CONTAINING FLUIDS

CROSS-REFERENCE TO RELATED APPLICATIONS

This application claims the benefit of U.S. Provisional Application No. 62/557,510 filed Sep. 12, 2017, which is hereby incorporated by reference.

FIELD

This disclosure relates to systems and methods for separation of hydrocarbon containing fluids. More particularly, the disclosure is relevant to separating fluids having a gas phase, a hydrocarbon liquid phase, and an aqueous liquid phase.

BACKGROUND

Most formations bearing hydrocarbons simultaneously produce an oil phase, a gas phase and an aqueous phase, usually brine. Several wells can be tied together through a gathering line into a separation or processing plant, sometimes comprising just a simple tank, where initial gravity separation of water, oil and gas occurs. Theoretically, gas is taken from the top, water and sediments are drawn from the bottom, and the oil is drawn from the middle of the mixture. In practice, such separations have generally involved the direct heating of the hydrocarbon feed to achieve better separation of the three phases (the gas phase, the lighter hydrocarbon liquid or oil, and the heavier aqueous liquid). Unfortunately, when using conventional systems for separating the three phases, it can be difficult and costly to meet vapor pressure specifications. Accordingly, new techniques for better meeting vapor pressure specifications are of interest in the industry.

SUMMARY OF THE INVENTION

As disclosed herein, systems and methods for separation of hydrocarbon containing fluids are provided. Such systems and methods work to provide a superior solution for separating a three-phase feed having a gas phase, an aqueous liquid phase, and a hydrocarbon phase. The gas phase typically comprises a gaseous light hydrocarbon. The aqueous liquid phase generally comprises water, saltwater or brine, such as produced water from oil production operations. The hydrocarbon liquid phase is typically composed of hydrocarbons that are in a liquid state at temperatures from about 32° F. to about 150° F., at standard pressure. While the invention has wider applicability, a typical area where it is useful is in separating gaseous hydrocarbons and aqueous liquid entrained in a hydrocarbon feed from a producing oil well.

In one aspect, the present disclosure provides a process for the separation of a first fluid stream comprising a gas phase, and aqueous liquid phase and a hydrocarbon liquid phase. The process comprises introducing the first fluid stream into a first separation zone at a first pressure and a first temperature. The first pressure is at least 50 psig. In the first separation zone, a first gas stream is separated from the first fluid stream to produce a second fluid stream. The separation of the first gas stream occurs at the first pressure. After the first separation, the second fluid stream is introduced into a second separation zone where a second gas stream is separated from the second fluid stream in the second separation zone to produce a third fluid stream. The separation of the second portion of the gas takes place at the near atmospheric pressure. The third fluid stream is then indirectly heated to a second temperature greater than the first temperature but below the saturation temperature of the aqueous liquid. The thus heated third fluid stream is introduced to a third separation zone where a third gas stream is separated from the heated third fluid stream to produce a fourth fluid stream.

In some embodiments of the process, the separation in the first separation zone includes separating a first aqueous liquid stream from the first fluid stream. In other embodiments of the process, the separation in the second separation zone includes separating a first aqueous liquid stream from the second fluid stream.

Generally, the reduction of the second fluid stream from the first pressure to the near atmospheric pressure can occur prior to introducing the second fluid stream into the second separation zone. The step of reducing the second fluid stream to near atmospheric pressure can increase the gas phase such that the second fluid stream has an increased gas concentration after the step of reducing than before the step of reducing. Also, the step of indirectly heating the third stream can increase the gas phase such that the heated third fluid stream has a higher concentration of gas than the third fluid stream prior to the step of indirectly heating.

Some embodiments further comprise pumping the third fluid stream to the indirect heater and thus elevating the third fluid stream to a pressure from 10 psig to 30 psig.

Generally, the fourth fluid stream comprises less than 1% by volume aqueous liquid and less than 1% by volume gas, and can comprise less than 0.1% by volume aqueous liquid and less than 0.1% by volume gas.

In some of the above embodiments, the first temperature is below 100° F., the first pressure is above 100 psig, and the near atmospheric pressure is less than about 5 psig. The first temperature can be from about 32° F. to below 100° F. and the second temperature can be above 100° F.

In another aspect, the disclosure provides a system for separation of an aqueous liquid and a gas from a first fluid at a first pressure wherein the first fluid has a gas phase, an aqueous liquid phase and a hydrocarbon liquid phase. The system comprises a first separator, a pressure reducer, a second separator, an indirect heater and a third separator.

The first separator is configured to separate a first portion of the gas from the first fluid to produce a second fluid. The separation in the first separator is carried out at the first pressure of at least 50 psig.

The pressure reducer is configured for reducing the second fluid from the first pressure to a second pressure so as to produce a third fluid at the second pressure. The second pressure is near atmospheric.

The second separator is configured to separate a second portion of the gas from the third fluid to produce a fourth fluid. The separation in the second separator is carried out at the second pressure. Further, the system includes at least one of:

the first separator configured to separate a portion of the aqueous fluid from the first fluid; or the second separator configured to separate a portion of aqueous fluid from the third fluid.

The indirect heater receives and indirectly heats the fourth fluid. The third separator is configured to separate a third portion of the gas from the thus heated fourth fluid to produce a fifth fluid.

In some embodiments of the system, the first separator is a three-phase separator in which the first portion of the gas and the portion of aqueous fluid are separated from the first fluid. In such embodiments, the second separator can be a two-phase separator in which the second portion of gas is separated from the third fluid.

In some of the above embodiments, the third separator can be a three-phase separator in which the third portion of the gas and a further portion of aqueous fluid are separated from the heated fourth fluid.

Also, in some of the above embodiments, the indirect heater can comprise a burner, a container, a fire-tube and a coil. The container can hold a bath liquid. The fire-tube at least partially extends through the container and is connected to the burner such that hot gaseous effluent flows through the fire-tube and thus heats the bath liquid. The coil extends at least partially through the container. The coil is configured to receive the first hydrocarbon-enriched stream, which is thus heated by the contact of the coil with the bath liquid.

Many of the embodiments further comprising a pump configured to pump the fourth fluid to the indirect heater and thus elevate the fourth third fluid stream to a third pressure from 10 psig to 30 psig.

DESCRIPTION

The present disclosure may be understood more readily by reference to the following description including the examples. In addition, numerous specific details are set forth in order to provide a thorough understanding of the embodiments described herein. However, those of ordinary skill in the art will understand that the embodiments described herein can be practiced without these specific details. In other instances, methods, procedures and components have not been described in detail so as not to obscure the related relevant feature being described. Additionally, the description is not to be considered as limiting the scope of the embodiments described herein.

Referring now to the drawings, wherein like reference numbers are used herein to designate like elements throughout the various views, various embodiments are illustrated and described. The figures are not necessarily drawn to scale, and in some instances the drawings have been exaggerated and/or simplified in places for illustrative purposes only. Where components of relatively well-known designs are employed, their structure and operation will not be described in detail. One of ordinary skill in the art will appreciate the many possible applications and variations of the present invention based on the following description.

The following describes a system of equipment whose individual benefits work to provide a superior solution for separating a three-phase feed having a gas phase, an aqueous liquid phase, and a hydrocarbon liquid phase. The gas phase typically comprises a gaseous light hydrocarbon, such as methane, ethane, propane, butane and the like. As used herein, gaseous light hydrocarbons are ones in a gaseous state at temperatures from about 32° F. to about 150° F., at standard pressure. The gas phase can also include non-hydrocarbons that are gaseous in the aforementioned temperature range, for example carbon dioxide and sulfur dioxide.

The aqueous liquid phase generally comprises water, saltwater or brine, such as produced water from oil production operations. The hydrocarbon liquid phase is typically composed of hydrocarbons that are in a liquid state at temperatures from about 32° F. to about 150° F., at standard pressure. While the invention has wider applicability, a typical area where it is useful is in separating gaseous hydrocarbons and aqueous liquid entrained in a hydrocarbon feed from a producing oil well.

The system in its most simple form is a separator followed by pressure reducer, a second separator, an indirect heater and then a third separator. There may be other up or downstream equipment associated with this unit, such as tankage, valves, piping, flares, etc.

As will be appreciated from the below disclosure, the current system allows closer proximity of the equipment and greater insulation of the final stages of separation than prior art systems relying on direct heating of the treatment stream. In the current system, heat loss in the lines is negligible due to the proximity of the equipment and insulation of the final stages of separation. On the other hand, prior art systems have suffered from significant heat losses due to the necessity of locating direct heat treaters away from other tanks and process equipment. Accordingly, such systems have suffered from temperature losses often greater than 30° F. in the lines/conduits from the direct heat treater to the storage tank. Unfortunately, these temperature losses result in a product that does not meet Reid Vapor Pressure (RVP) requirements. In these past systems, RVP requirements are met only by introducing significant process disadvantages. For example, RVP requirements are met when the product is leaving the storage tank only by taking off significant gas (>0.1 MMscfd) from the tankage. Additionally, RVP for product entering the storage tank is met only by significantly increasing the heater duty, and then it is met only by sacrificing product yield; that is, product yields are significantly lowered (more than a 5% reduction and in some cases more than a 10% reduction). However, the current system eliminates these disadvantages. Use of an indirect heater instead of direct heating, and other process changes, virtually eliminate the heat loss in the lines from the heating to the storage tank. Even if heat losses occur in the current system, those losses only increase the duty required in the indirect heater but will not reduce product yield while meeting RVP specifications. Other advantages will become apparent from the below disclosure.

As used herein, "direct heater" and "direct heating" refer to a style of heating where hot burner gases directly heat the treatment stream, typically process liquid or process gas. For example, a burner provides hot gasses that transfer their heat energy to the treatment stream flowing directly through coils installed inside the heater vessel. Alternatively, the hot gases may be introduced into a fire-tube, which is submerged in the treatment stream such that the treatment stream flows around the fire-tube and is thus heated. In this disclosure, the treatment stream for the indirect heater is hydrocarbon stream, which often contains only a hydrocarbon liquid phase or can contain a hydrocarbon liquid phase and an aqueous liquid phase. However, it is within the scope of this disclosure for the treatment stream to have a hydrocarbon liquid phase, an aqueous liquid phase and a gas phase.

Figure 1:
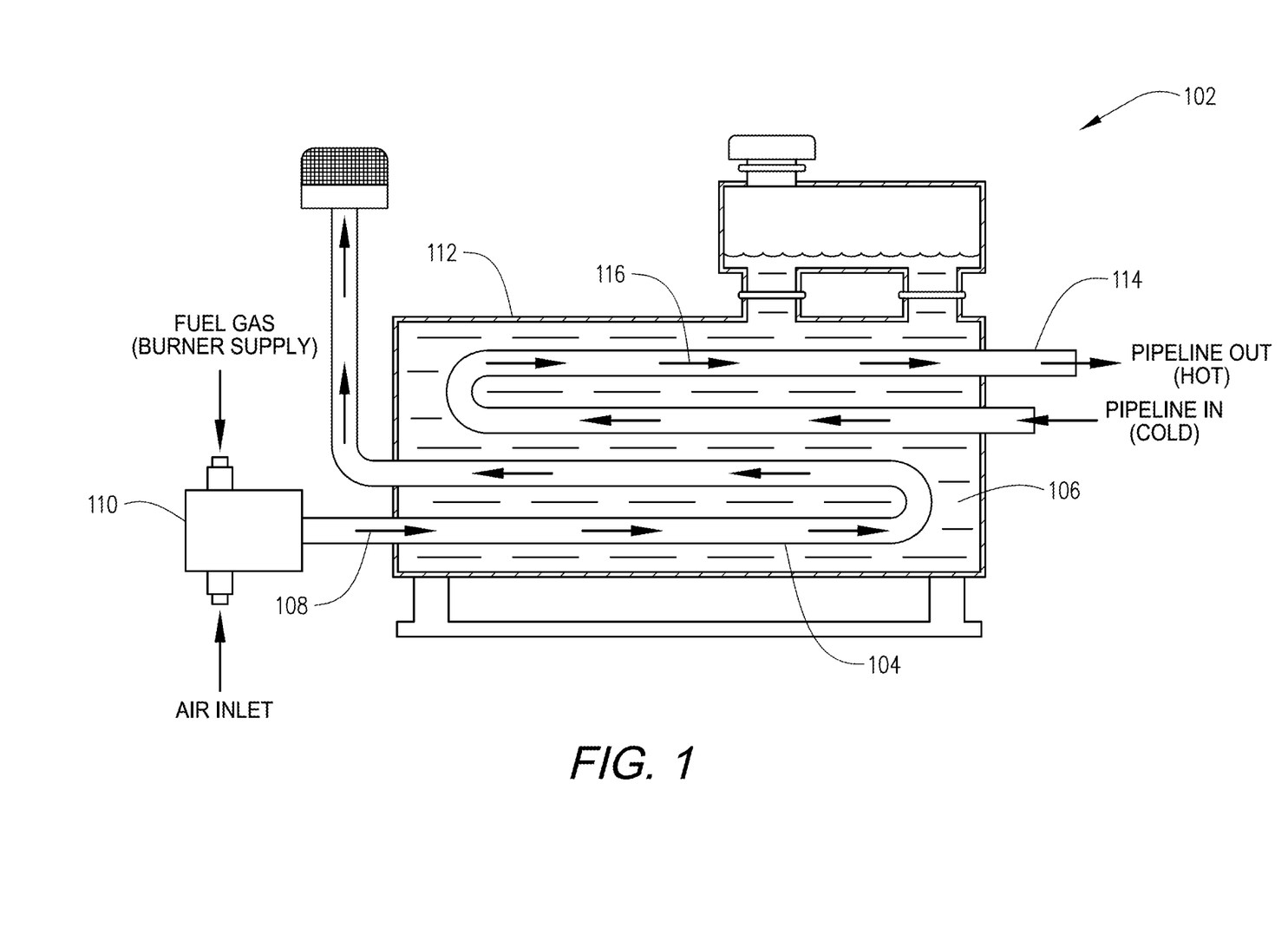
FIG. 1 is a schematic representation of an indirect heater as might be used in some embodiments.

As used herein "indirect heater" or "indirect heating" refers to a style of heating in which an intermediary bath liquid is directly heated by the hot burner gases and then the bath liquid is used to heat the treatment stream. For Example, FIG. 1 illustrates an indirect heater 102. In FIG. 1, a fire-tube 104 is submerged in a bath liquid 106 such that bath liquid 106 is heated by hot burner gases 108 flowing through fire-tube 104. The indirect heater of FIG. 1 comprises a burner 110, a container 112, a fire-tube 104 and a coil 114. Container 112 holds bath liquid 106. Fire-tube 104 at least partially extends through container 112 so as to be submerged in bath liquid 106. Fire-tube 104 is connected to burner 110 such that hot burner gases 108 flow through fire-tube 104 and thus heats bath liquid 106. Coil 114 extends at least partially through container 112. Coil 114 is configured to receive the treatment stream 116, which is thus heated by contact of coil 114 with bath liquid 106. Thus, heated bath liquid 106 is used to heat treatment stream 116 by flowing treatment stream 116 through coil 114, which is submerged in heated bath liquid 106. Bath liquid 106 will often be water or a mixture of water and glycol.

Figure 2:
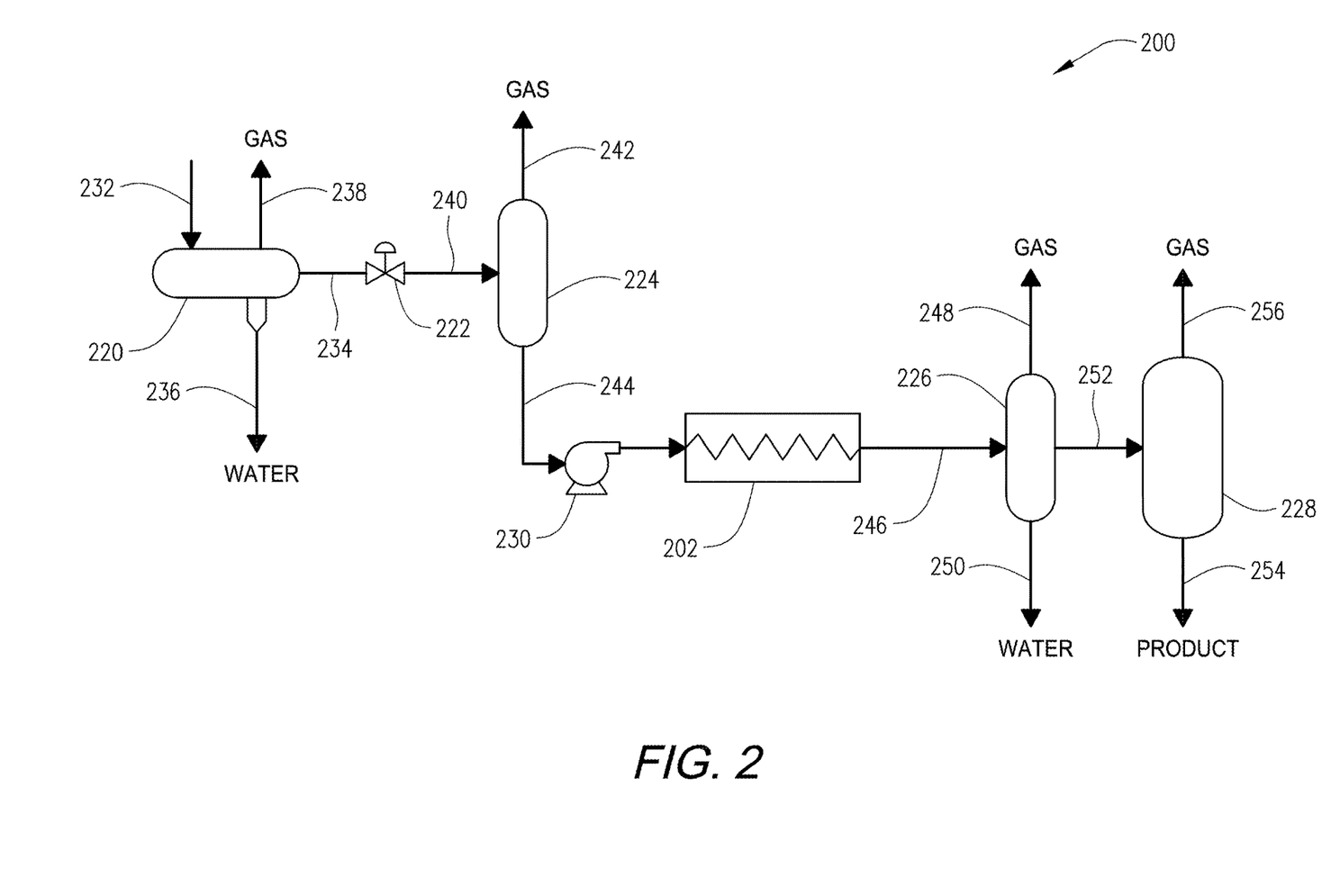
FIG. 2 is a schematic illustration of a system for carrying out a process for separating a three-phase feed in accordance with one embodiment.

Turning now to FIG. 2, the schematic representation of a system 200 to carry out the process is illustrated. System 200 comprises a first three-phase separator 220, pressure reducer 222, a two-phase separator 224, an indirect heater 202 and a second three-phase separator 226. Three-phase separators are separators wherein a feed comprising a gas phase and a lighter liquid and a heavier liquid phase are separated into the three phases: gas, lighter liquid and heavier liquid. Such a separator is also called a gas/liquid/liquid separator. Three-phase separators are used in the oil industry to separate mixtures of hydrocarbons (gas and oil, and water) into the constituent gas, oil and water. The three-phase separators can be a tower separator such as described in co-pending U.S. patent application Ser. No. 15/426,802, filed on Feb. 7, 2017. Two-phase separator 224 is a separator where a feed stream is separated into two phases: gas and liquid.

As illustrated, a first fluid stream or feed stream 232 is introduced into first three-phase separator 220, which operates as a first separation zone. Feed stream 232 is a three-phased hydrocarbon stream having a gas phase, an aqueous liquid phase and a hydrocarbon liquid phase. Feed stream 232 is a pressurized feed stream generally having a pressure greater than 50 psig. More typically, the pressure is greater than 75 psig, including at least 80 psig and at least 100 psig. Commonly, the pressure will be from 50 psig to 80 psig or 75 psig to 125 psig. Feed stream 232 generally is at a first temperature that is about ambient, typically from 32° F. to less than 100° F., more typically from 50° F. to 90° F., and in some cases from 60° F. to about 85° F. The pressure of feed stream 232 typically is not reduced prior to entering the two-phase separation. However, if reduced, it is not reduced below 50 psig, and under most circumstances, the pressure of feed stream 232 would not be reduced to adversely affect the pressure of the gas separated out from the feed steam in first three-phase separator 220, as described below. Gas removed from feed stream 232 has its pressure adversely affected if the pressure of the gas is below the pressure at which the gas stream can be sold without repressurizing, as further discussed below.

In first three-phase separator 220, a first portion of the aqueous liquid phase and a first portion of the gas phase are separated from a three-phase hydrocarbon feed to produce a second fluid stream or a hydrocarbon-enriched stream 221, which is now richer in the liquid hydrocarbon phase than feed stream 219. The first portion of the aqueous liquid phase 236 can be disposed of as waste. The first portion of the gas phase 238 is typically rich in gaseous hydrocarbons and is at an elevated pressure (above 50 psig, often at least 75 psig or at least 80 psig) thus can be sold as a product.

Hydrocarbon enriched stream (second fluid stream) 234 from separator 220 undergoes pressure reduction at pressure reducer or control valve 222. At pressure reducer 222, the pressure of the hydrocarbon enriched stream is reduced from an elevated pressure (greater than 50 psig, as described above) to near atmospheric pressure.

As used herein "near atmospheric" means a pressure close to, typically within about 10 psig of, the surrounding atmospheric pressure More typically, this is from about 0 psig to about 10 psig, and can be below about 7 psig, below about 5 psig or below about 2 psig.

The reduction of pressure to near atmospheric can result in a reduction in the temperature for the depressurized stream 240 from the temperature of the second fluid stream 234. Additionally, the reduction of pressure to near atmospheric can liberate further gas that thus increases the gas phase content of the depressurized stream 240 coming from pressure reducer 222. Additionally, in most cases, substantially or essentially all the aqueous liquid phase was removed at first three-phase separator 220; however, it is within the realm of this disclosure for depressurized stream 240 to still have a significant aqueous fluid phase.

As illustrated, depressurized stream 240 is introduced into two-phase separator or separation zone 224 wherein a portion of the gas phase 242 is separated from the liquid phase or liquid phases of depressurized stream 240. Accordingly, a second enriched stream 244, which is richer in the liquid hydrocarbon phase than depressurized stream 240, is produced. Additionally, the separated portion of the gas phase 242 is removed from two-phase separator 224 and can be sent to flare as waste. While not currently preferred, it is within the scope of this invention for separation zone 224 to be a three phase separator where both a gas phase and an aqueous liquid phase are separated from the depressurized stream.

Typically, a pump 230 pumps second enriched stream 244 from two-phase separator 224. Pump 230, if used, generally imparts sufficient pressure to move the fluid streams through the equipment downstream of two-phase separator 224, for example, overcoming the head losses of the indirect heater 202. The pumping can be at relatively low pressure and can maintain the near atmospheric pressure of second enriched stream 244, though elevated over the pressure of second enriched stream prior to pumping. More typically, the relatively low pressure will increase the pressure to above near atmospheric pressure. Thus, the pumping will pressurize second enriched stream 244 to about 15 psig to about 30 psig, or about 15 psig to 25 psig. While the pumping can be performed prior to two-phase separator 244, such an arrangement causes two-phase separator to not operate at near atmospheric pressure and thus lessens the advantage of system 200, which has a more complete separation of the gas phase from second enriched stream 244.

The second enriched stream 244 is then sent to indirect heater 202, which indirectly heats the second enriched stream by use of a liquid bath as described above. As will be realized, the pressure of the second enriched stream is substantially less than the pressure of the feed stream 232. This pressure reduction helps achieve the advantages attributed to lower heater duty thus reducing system demands and cost. Specifically, indirect heater 202 is placed near (e.g. ~20 ft.) or in-line with the separators 224 and 226, which results in no significant heat loss or pressure drop through the piping. Conversely, a direct heater is usually installed outside the explosion limits (e.g. ~200 feet), which requires significant heat duty to maintain proper temperature and results in high-pressure drop through the piping.

Second enriched stream 244 generally has no or essentially no gas phase immediately downstream from two-phase separator 244. Additionally, although traces of the aqueous liquid phase may be present, second enriched stream 244 is generally free or essentially free of the aqueous liquid phase. By "essentially free", it is meant a negligible amount or less than 0.1% by volume; however, it is within the scope of the invention for the amount of gas phase or aqueous liquid phase to be less than 1% by volume or less than 0.5% by volume.

Second enriched stream 244 is introduced into the indirect heater (indirect heating zone) 302 so that it is indirectly heated to a second temperature greater than the first temperature but below the saturation temperature of the aqueous liquid present in feed stream 232. The saturation temperature is the temperature for a corresponding saturation pressure at which a liquid boils into its vapor phase. The liquid can be said to be saturated with thermal energy. The second temperature can depend on the composition of the enriched fluid stream and the pressure at which heat is applied. Typically, the second temperature is above 100° F. and, in some embodiments, up to about 160° F. Generally, the second temperature is from about 100° F. to about 160° F. and can be from about 110° F. to 150° F.

During heating in indirect heater 202, more volatile components of the liquid hydrocarbon phase of second enriched stream 244 are vaporized so as to generate additional gas phase, that is, so as to increase the concentration of the gas phase of second enriched stream 244. Thus, a heated stream 246 having an increased gas phase concentration is produced in indirect heater 202.

Next, heated stream 246 is introduced into second three-phase separator 226. Within second three-phase separator 226, the gas phase of heated stream 246 is separated from the hydrocarbon liquid phase. Any gas phase 248 separated off can be sent to flare to burn as waste. Additionally, any remaining aqueous liquid phase is separated from the hydrocarbon liquid phase. Any such aqueous liquid phase 250 can be disposed of as waste. The resulting hydrocarbon liquid stream 252 from three-phase separator 226 can be sent to a tank 228 for storage. Product 254 can be taken from tank 228 as needed. Additionally, any gas 256 separating out of the product in tank 228 can be removed and sent to flare; however, it is an advantage of the system of this disclosure that generally no significant amount of gas needs to be removed from tank 228.

The resulting hydrocarbon liquid stream 252 is substantially hydrocarbon liquid phase with only negligible amounts of gas phase or aqueous liquid phase. Generally, remaining hydrocarbon liquid stream 252 comprises less than 1% by volume aqueous liquid phase and less than 1% by volume gas phase. More typically, hydrocarbon liquid stream 252 comprises less than 0.5% by volume aqueous liquid phase and less than 0.5% by volume gas phase, or less than 0.1% by volume aqueous liquid phase and less than 0.1% by volume gas phase, or hydrocarbon liquid stream 252 is essentially free of aqueous liquid and gas. Hydrocarbon liquid stream 252 can be sent to tank 228 for storage until shipped or sold.

Thus, the combination of the various elements in this process, such as near atmospheric separation prior to indirect heating and final three-stage separation low pressure allows for minimal heat loss and achieves a product in tank 228 which has essentially no aqueous liquid component or gas component. Additionally, the system allows for achieving desired Reid vapor pressure (RVP) at lower energy costs as illustrated by the examples below. As will be realized from this disclosure, the low pressure application of heat, and the indirect heater 202 and final separator 226 having equal or near equal pressure to the tank 228 avoids the impact of temperature losses and re-condensing of gaseous hydrocarbons back into the liquid oil, which causes RVP issues. Prior art processes had issues with the pressure drop and line-temperature losses. The operating of conventional treaters, where heat is applied under pressure (greater than 25 psig), can cause a stream bubble point that undergoes pressure drop such that a gas phase flash separates from the liquid stream, thus causing a temperature loss. The result of the flash separation and temperature loss is that the product does not meet specifications. To rectify this, prior art processes have utilized more heat, which causes both light and medium to heavy hydrocarbons to cook off. These issues are avoided by application of the current process.

Although, not shown in the FIG. 2, flow from each of the separators can be controlled by level control valves. For example, as a feed stream enters a separator, a mechanical float operated trunnion valve can achieve level control, maintain desired levels and allows the product stream to flow out of the separator. The gas phase that is separated out of the feed stream can be let down in pressure, as necessary, through a pressure control valve, which is adjusted from open to close based on monitoring of the pressure upstream of pressure control valve. For separator 220, the pressure control valve can be set slightly above sales pressure to achieve adequate flow to the sales line. Where the separated gas phase is to go to flare, a pressure control valve can monitor the upstream pressure, which can be set at the desired operating pressure of the relevant separator to achieve optimum separation. The pressure control valve holds backpressure on the system and lets down the gas to the flare line pressure as needed.

The aqueous phase, which can collect at the bottom of one of the three-phase separators, can be monitored by a weighted displacer level control to detect interface of the oil/water layer. The level control can be a pneumatic type and can deliver a pneumatic direct acting signal to a level control valve. As the aqueous phase level increases, the level control increases the signal to the level control valve so that the valve opens thus allowing the aqueous phase to dump. This can happen proportionally between level and output. The higher the level, the higher the output signal to the valve to open.

The remaining product, which is mostly liquid hydrocarbons or oil, can accumulate in an oil bucket of a three-phase separator and can be monitored by another weighted displacer level control to detect the top of the liquid hydrocarbon level. As the liquid hydrocarbon level increases, the level control increases the signal to a level control valve so that the level control valve opens thus allowing this product fluid stream to flow out of the separator. This can happen proportionally between level and output. The higher the level, the higher the output signal to the valve to open.

In indirect heater 202, temperature control is achieved through the burner management system (BMS), not shown. The BMS monitors the temperature of the heated fluid stream exiting indirect heater 202 and adjusts the heat to maintain a desired set point that is calculated to de-gas the enhanced fluid stream to meet RVP after the final stage of separation. The bath temperature is also monitored as a secondary control to the process temperature. This helps to maintain a minimum and maximum bath temperature in the event of no flow. There also can be secondary shutdown devices such as low bath level, high stack temperature and flame failure monitors to shut down the heater for equipment protection.

Figure 3:
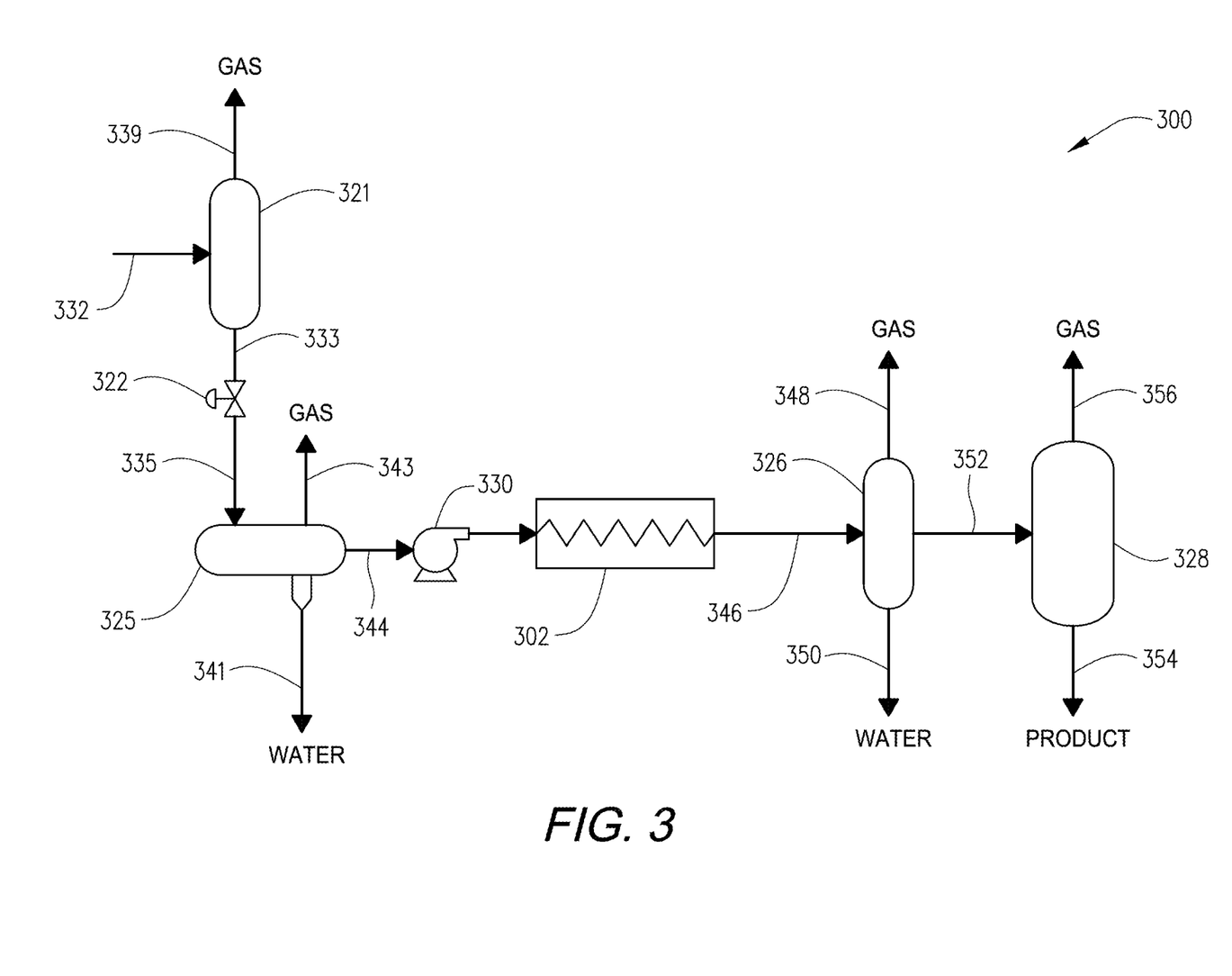
FIG. 3 is a schematic illustration of a system for carrying out a process for separating a three-phase feed in accordance with another embodiment.

Turning now to FIG. 3, a schematic representation of a system 300 is illustrated. System 300 represents another embodiment of the current system and method. Separation system 300 is similar to separation system 200, except for changes to the first separator and second separator. The first separator is two-phase separator 321, wherein a gas phase 339 is separated from feed stream 332 to produce hydrocarbon-enriched stream 333. The pressure of hydrocarbon-enriched stream 333 is lowered to near atmospheric as it passes through pressure reducer 322. The now near atmospheric-pressure stream 335 is then introduced into a first three-phase separator 325, wherein an aqueous liquid phase 341 and a gas phase 343 are separated from near atmospheric-pressure stream 335 to produce second enriched stream 344

From this point on system 300 is the same as system 200, with second enriched stream 344 passing through pump 330 to slightly increase the pressure to ensure adequate flow through the rest of system 300. Then second enriched stream 344 is heated in indirect heat exchanger 302 to produce a heated stream 346, which is separated in second two-phase separator 326. Gas phase 348 separated out of heated stream 346 is sent to flare, and aqueous liquid phase 350 separated out of heated stream 346 is a wastewater stream. The product, hydrocarbon-liquid stream 352 is sent to tank 328 for storage until needed.

Product 354 can be taken from tank 328 as needed. Additionally, any gas 356 separating out of the product in tank 328 can be removed and sent to flare; however, it is an advantage of the system of this disclosure that generally no significant amount of gas needs to be removed from tank 328.

Like the embodiment illustrated in FIG. 2, separation system 300 can include various control valves and BMS not shown in FIG. 3.

It will be realized from the above, that aqueous liquid phase 341 will be removed from first three-phase separator 325 at near atmospheric pressure. Accordingly, removal and handling of aqueous liquid phase 341 can require pumping systems not necessary for system 200, which removes aqueous liquid phase 236 from the first three-phase separator 220 at a higher pressure than system 300. Accordingly, system 200 is currently preferred over system 300 because of the lower cost associated with handling the aqueous liquid phase.

The above described system and process have the following benefits.
  Reduced heat duty requirements of the heat source due to heating primarily an oil phase.
  Reduced salt deposition on heat source walls. In the case of direct-fired solutions using a fire-tube, this salt deposition has negative heat transfer impacts. It also creates hot spots on the fire-tube, which can eventually lead to fire-tube failure, which is commonly catastrophic and results in damaged equipment and possible injury.
  The indirect heater, which can take the form of a water bath heater, provides heat to the oil through a water bath. The oil traverses a coil, under pressure, immersed in a bath of water and glycol mixture at atmospheric pressure. During a fire-tube failure, leaked glycol/water will flow into the fire-tube not resulting in a catastrophic failure but in a visible cloud and eventually a bath low-level alarm causing a shutdown of the heater. This is not a flammable liquid and will not result in a catastrophic failure.
  During a coil leak/failure, the pressure across the heater will not be maintained, which trips an alarm so that the system is shut down. The dumping of the oil into the water bath will not result in a catastrophic failure.
  The coil can be plumbed to allow for fresh water to be circulated through the system to remove any mild scaling or salt deposition which might occur on the coil. Such a flushing or cleaning system is an improvement on heat treater fire-tubes.
  Use of indirect heat allows for closer proximity of the water bath heater to the separator than is allowed for direct heaters. This proximity of equipment will result in less land use, lower environmental impact, and less heat loss from the heater to the tankage or next stage of separation.
  Application of heat at lower pressure results in lower duty.
  The above system, including use of the above-described three-phase separator, will provide a process which will ensure that 100% liquid is passed to the tank.

PROPHETIC EXAMPLES

In order to illustrate the benefits of a system in accordance with this disclosure, the following calculated prophetic examples have been prepared. In each case, the controls and example are calculated for a three-phase hydrocarbon feed under the conditions indicated in Table 1.

TABLE 1

| Temperature | ° F. | 80 |
| Pressure | psig | 220 |
| Std Liquid Volumetric Flow | bbl/d | 14026 |

The hydrocarbon liquid phase and gas phase components of the hydrocarbon feed are under the conditions indicated in Table 2 with the composition indicated in Table 3.

TABLE 2

| OIL PHASE AND GAS PHASE | | |
| --- | --- | --- |
| Temperature | ° F. | 80 |
| Pressure | psig | 220 |
| Std Liquid Volumetric Flow | bbl/d | 8026 |

TABLE 3

| Mole Fraction | % | Mole Fraction | % |
| --- | --- | --- | --- |
| Oxygen | 0.000 | m-Xylene | 0.065 |
| $H_2S$ | 0.000 | p-Xylene | 0.403 |
| Carbon Dioxide | 2.520 | o-Xylene | 0.096 |

TABLE 3-continued

| Mole Fraction | % | Mole Fraction | % |
| --- | --- | --- | --- |
| Nitrogen | 0.133 | Heptane | 2.323 |
| Methane | 44.104 | Octane | 1.891 |
| Ethane | 12.950 | Nonane | 0.648 |
| Propane | 11.199 | Decane | 0.559 |
| i-C4 | 3.647 | Undecane | 0.335 |
| n-C4 | 10.339 | Dodecane | 0.343 |
| i-C5 | 0.577 | Tridecane | 0.394 |
| n-C5 | 1.051 | Tetradecane | 0.303 |
| 2-Methylpentane | 0.656 | Pentadecane | 0.351 |
| 3-Methylpentane | 0.262 | Hexadecane | 0.260 |
| n-Hexane | 0.932 | Heptadecane | 0.196 |
| 2,2,4-Trimethylpentane | 0.135 | Octadecane | 0.178 |
| Benzene | 0.135 | Nonadecane | 0.134 |
| Toluene | 0.628 | Eicosane | 2.298 |
| Ethylbenzene | 0.051 | Water | 0.000 |

The aqueous liquid phase component of the hydrocarbon feed is under the same temperature and pressure conditions and has a standard liquid volumetric flow of 6000 bbl/d. For all the systems illustrated, it is assumed that the oil product needs to meet a 10.842 psi Reid vapor pressure (RVP).

Control I

Figure 4:
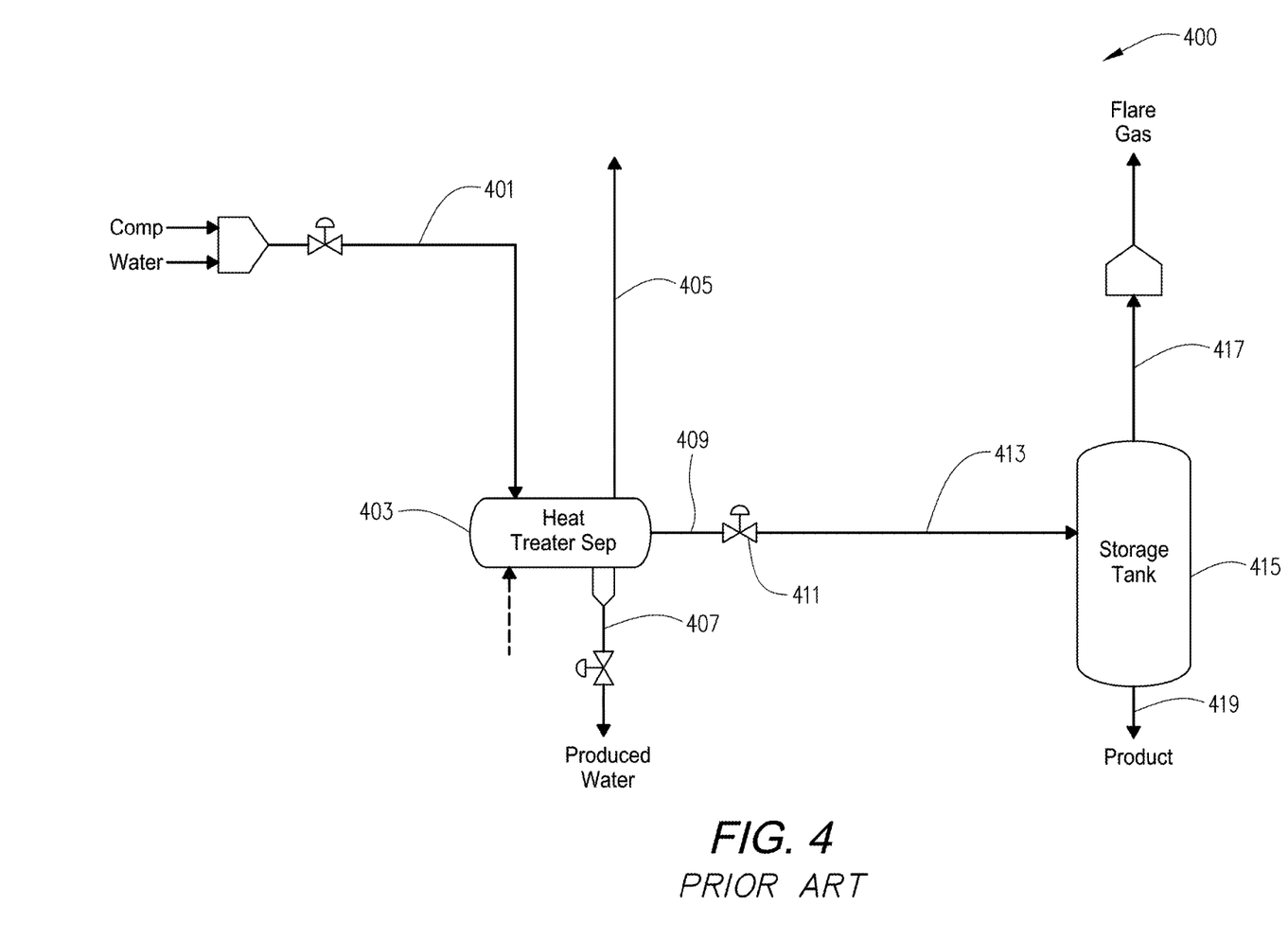
FIG. 4 is a schematic illustration of a prior art system for separation of a hydrocarbon feed stream.

Product properties are calculated for a separation system 400 illustrated in FIG. 4. In the system of Control I, direct heat treating and three-phase separation are carried out in a heat treater vessel 403. An initial three-phase feed stream 401 is introduced into heat treater vessel 603 without prior separation treatment. Within vessel 403, feed stream 401 is heated and separated into a sales gas 405, produced water 407 and an enriched stream 409 that has a greater concentration of liquid hydrocarbons than feed stream 401. Enriched stream 409 is depressurized down to near atmospheric pressure at pressure reducer 411. The depressurized stream 413 is then introduced into storage tank 415, where further degassing occurs. Gas 417 from tank 415 is taken to flare. Product 419 can be removed from the tank.

The heat treater vessel is operating at 125 psig with no upstream three-phase separation equipment. The model assumes a line heat loss resulting in 30° F. of heat loss for the fluid between entering line 413 and being taken off as product 419. The product (in stream 409) is depressurized to less than 1 psig (15 psia) downstream of the heat treater and upstream of the storage tank.

Table 4 below shows a comparison of Controls I to VI and Example I. Note for Control I, the liquid product 419 is meeting the RVP specification (RVP Exiting Tankage) but the treated fluid entering the storage tank 415 is not (RVP Entering Tankage). Additionally, the system of Control I uses 9.6318e+006 Btu/h to heat the hydrocarbon feed. If additional heat losses occur or condensing of tank vapors occurs, the duty would increase within the heat treater and the amount of recovered oil product commonly decreases.

Control II

Figure 5:
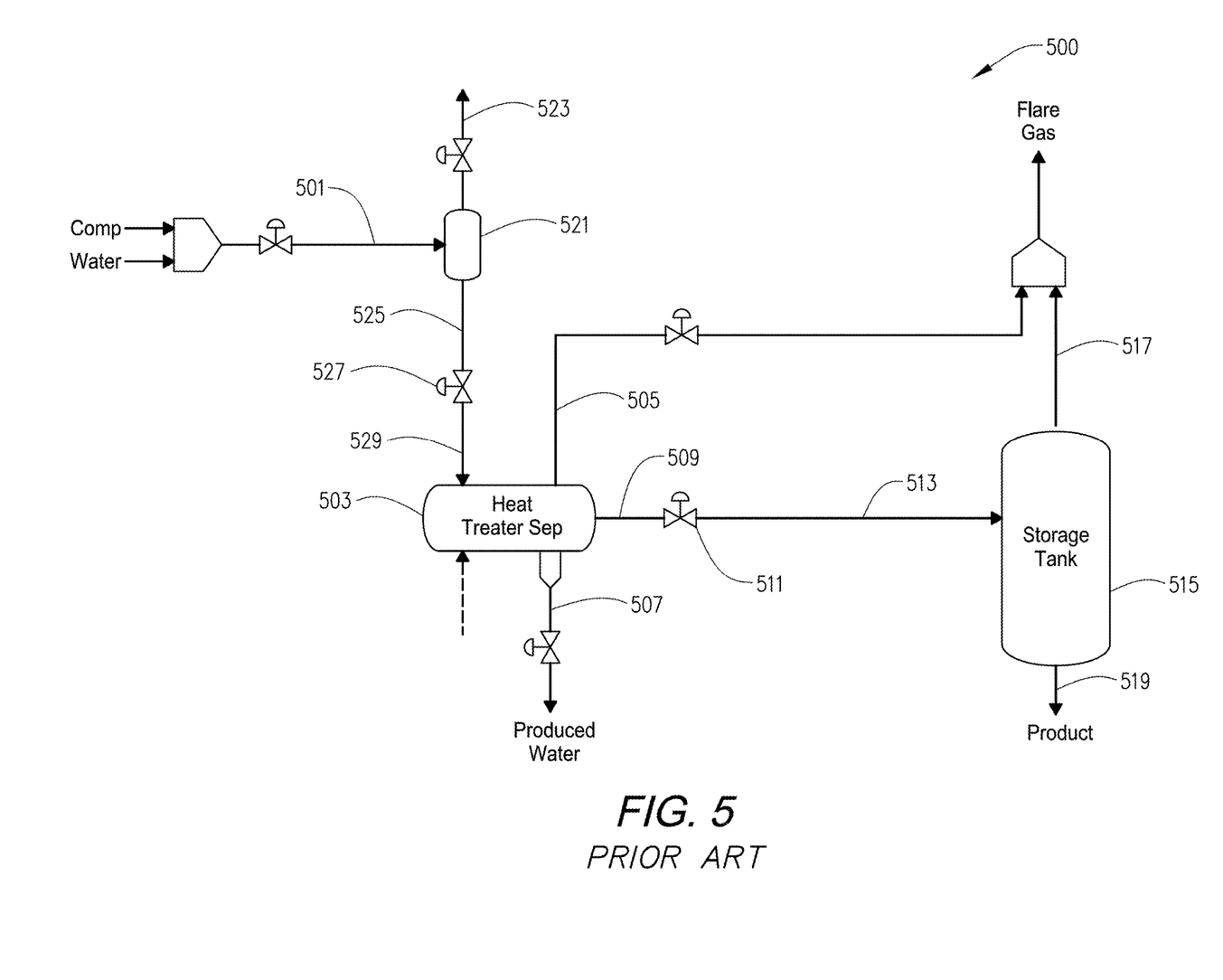
FIG. 5 is a diagrammatic illustration of another prior art system for separation of a hydrocarbon feed stream.

Product properties are calculated for a separation system 500 illustrated in FIG. 5. In the system of Control II, direct heat treating and three-phase separation are carried out in a heat treater vessel 503. An initial three-phase feed stream 501 is introduced into two-phase separator 521. Within two-phase separator 521, sales gas 523 is separated from the liquid stream 525. Liquid stream 525 has a reduced gas content from the initial three-phase feed stream 501. Liquid stream 525 is depressurized at pressure reducer 527 to a mid-pressure stream 529, which is introduced into heat treater vessel 503. Within vessel 503, mid-pressure stream 529 is heated and separated into a gas 505, produced water 507 and an enriched stream 509 that has a greater concentration of liquid hydrocarbons than liquid stream 525. Gas 505 is taken to flare. Enriched stream 509 is depressurized down to near atmospheric pressure at pressure reducer 511. The depressurized stream 513 is then introduced into storage tank 515, where further degassing occurs. Gas 517 from tank 515 is taken to flare. Product 519 can be removed from the tank.

Heat treater vessel 503 is operating at 35 psig with no upstream three-phase separation equipment. Accordingly, the liquid stream 525 undergoes depressurization prior to entering heat treater vessel 703. Subsequently, the enriched stream 509 from the heat treater vessel 503 is again depressurized to less than 1 psig (15 psia). Again, there is an assumed line heat loss resulting in 30° F. of heat loss for the fluid 513 between entering storage tank 515 and being taken off as product 519. The product (in stream 509) is depressurized from 35 psig to less than 1 psig (15 psia) downstream of the heat treater vessel and upstream of the storage tank.

Table 4 shows a comparison with Example I. Note in Control II, the liquid product 519 (RVP Exiting Tankage) is meeting the RVP specification (RVP Exiting Tankage) but the treated fluid entering the storage tank 513 is not (RVP Entering Tankage). Additionally, the system of Control II uses 9.78e+006 Btu/h to heat the hydrocarbon feed.

Control III

The properties are calculated for a system similar to that of Control II except the heater duty is increased to 13.3 MMBTU/hr in order to meet the RVP specification of the oil prior to entering the tankage (RVP Entering Tankage). The results are shown in Table 4. Note that the oil production reduces from 2632.1 bbl/d of oil in Control II to 2,398.6 bbl/d of oil for Control III.

Control IV

Product properties are calculated for a separation system similar to that of Control II, except that the heat treater is operating at 80 psig. Again, there is an assumed line loss resulting in 30° F. of heat loss for product entering the storage tank. The results are shown in Table 4.

For Control IV, the system uses 8.388e+006 Btu/h to heat the hydrocarbon feed. The liquid product exiting the storage tank is meeting the RVP specification (RVP Exiting Tankage) but the treated fluid entering the storage tank is not (RVP Entering Tankage).

Control V

Product properties are calculated for a separation system as per Control IV, except heater duty is increased to 13.6 MMBTU/hr in order to meet the RVP specification of the oil prior to entering the tankage (RVP Entering Tankage). The results are shown in Table 4. Note that the oil production reduces from 2492.5 bbl/d of oil in Control IV to 2,190.7 bbl/d of oil for Control V.

Control VI

Figure 6:
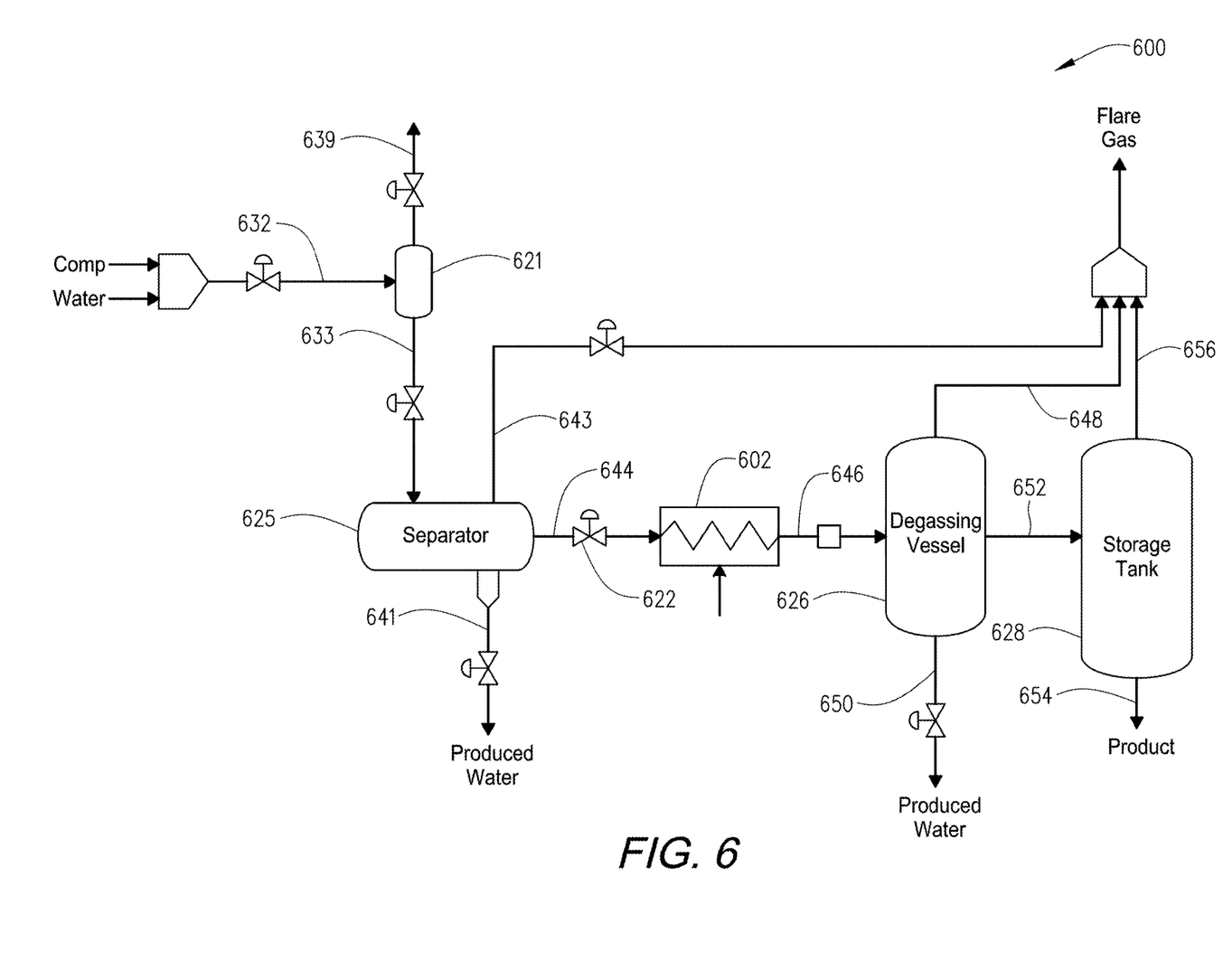
FIG. 6 is a diagrammatic illustration of a system for separation of a hydrocarbon feed stream in accordance with co-pending application U.S. application Ser. No. 15/426, 802, filed on Feb. 7, 2017.

Product properties are calculated for a separation system 600 illustrated in FIG. 6, which is in accordance with co-pending application U.S. application Ser. No. 15/426, 802, filed on Feb. 7, 2017. As illustrated in FIG. 6, the system of Control VI an initial three-phase feed stream 632 enters two-phase separator 621. Within two-phase separator 621, a sales gas 639 is separated from the liquid stream 633. Liquid Stream 633 has a reduced gas content from the initial three-phased feed stream 632.

Liquid stream 633 flows to first three-phase separator 625 where first three-phase separator 625 separates out the phases individually. As this separation occurs, the gas 643 from first three-phase separator 625 can be let down to flare pressure as there is not sufficient pressure left to enter the sales line. An aqueous liquid phase 641 is removed as waste. The remaining liquid stream 644, which is mostly liquid hydrocarbons or oil, undergoes a pressure reduction to near atmospheric prior by pressure reducer 622 prior to being introduced into indirect heater 602. In the system of Example I, the indirect heater 602 is operating at less than 1 psig (15 psia).

Heated stream 646 from indirect heat exchanger 602 is introduced into a second three-phase separator 626 where any remaining gas 648 is separated out and sent to flare and any remaining aqueous liquid 650 is separated out as waste. The hydrocarbon liquid stream 652 from three-phase separator 626 is introduced into tank 628 for storage until it is used as product 654. Any gas 656 that separates out of the product in tank 628 is sent to flare.

Accordingly, for system of Control VI, the hydrocarbon feed undergoes depressurization prior to entering the indirect heater. Also, the system of control VI allows closer proximity of the equipment and greater insulation of the final stages of separation. Thus, heat loss in the lines is negligible due to the proximity of the equipment and insulation of the final stages of separation.

Table 4 shows a comparison with Example I. Note in Control VI, the liquid product 654 (RVP Exiting Tankage) is meeting the RVP specification (RVP Exiting Tankage) as is the treated fluid entering the storage tank 652 (RVP Entering Tankage). Additionally, the system of Control II uses 1.5828e+006 Btu/h to heat the hydrocarbon feed.

Example I

Figure 7:
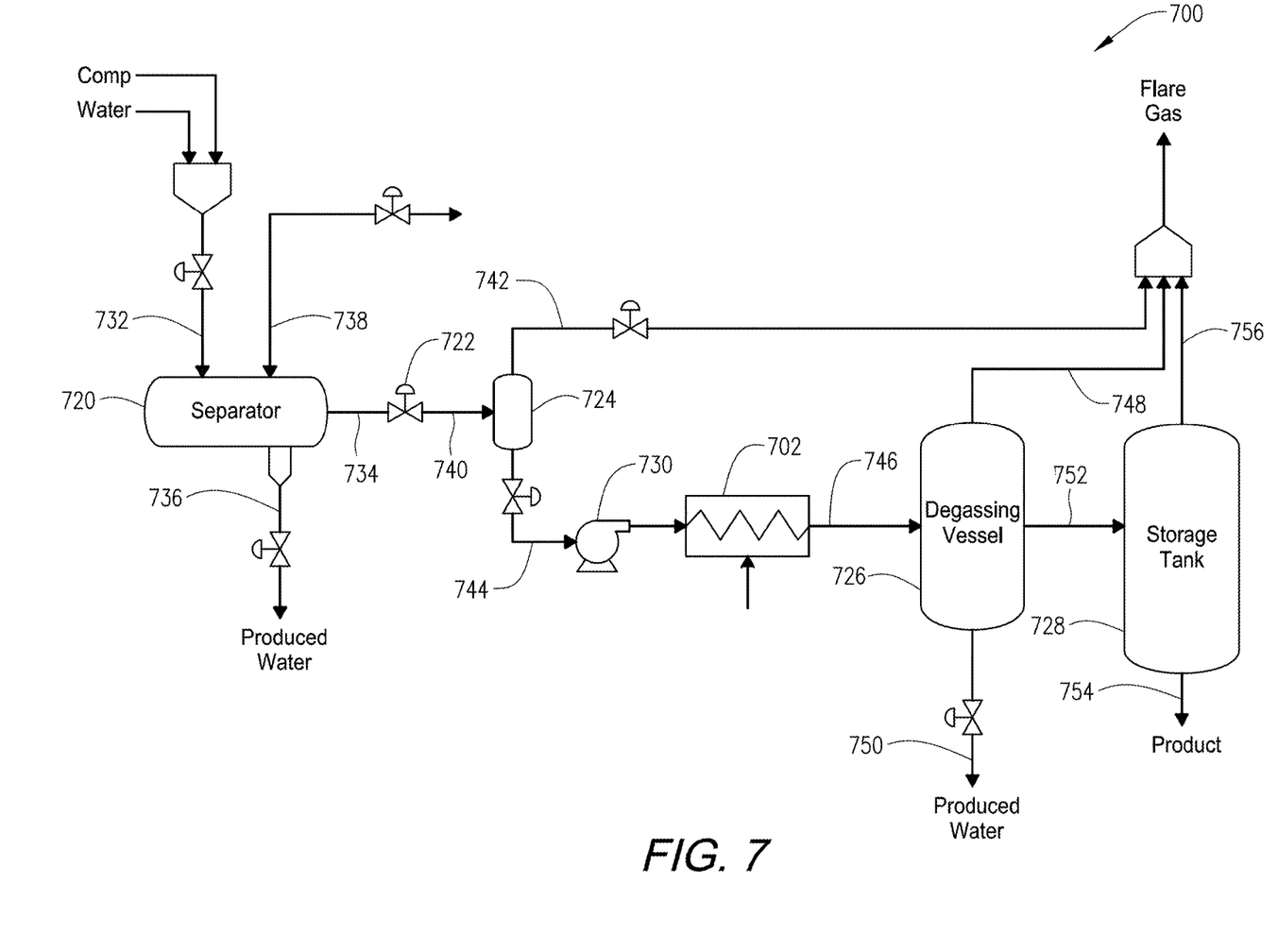
FIG. 7 is a diagrammatic illustration of a system for separation of a hydrocarbon feed in accordance with an embodiment of the current disclosure.

Product properties are calculated for a separation system in accordance with the current disclosure. The system is illustrated in FIG. 7, similar to FIG. 2 described above. In the system of Example I, initial three-phase fluid stream 732 is at an elevated pressure (220 psig) as is introduced into first three-phase separator 720, where gas 738 and aqueous liquid 736 are separated out. The resulting enriched fluid stream 734 has its pressure reduced to near atmospheric (0 psig) at pressure reducer 722 before the now depressurized stream 740 is introduced into two-phase separator 724. In two-phase separator 724, gas 742 is removed; thus, all the gaseous phase of the initial three-phase feed stream 732 has been removed in two-phase separator 724 and second three-phase separator 726.

The enriched hydrocarbon stream 744 from two-phase separator 724 is pumped by pump 730 under minimal pressure (about 15 psig) to indirect heat exchanger 702. The resulting heated stream (at about 131° F.) is introduced to second three-phase separator 726 where any remaining aqueous liquid 750 is removed. In addition, any gas 748 generated by the heating is removed and sent to flare. The hydrocarbon liquid stream 750 from separator 726 is introduced into tank 728. The liquid hydrocarbons in tank 728 can be stored until taken off as product 754. Any gas 756 released during storage is taken off tank 728 to go to flare.

Table 4 shows a comparison of Example I with Controls I to VI. Note in Example I, the liquid product 754 meets the RVP specification (RVP Exiting Tankage) and the treated fluid 752 entering the storage tank 728 (RVP Entering Tankage) also meets RVP specification. Additionally, Table 4 show that the system uses 1.675e+006 Btu/h to heat the hydrocarbon feed, which is substantially less than the heat treater duty required for Control I through Control V, however slightly higher than that of Control VI. The heat treater duty required here is 19% or less than that in Controls I through V. Liquid product yields of Example I are greater than that of Control I, II and VI. Moreover, when a vapor pressure specification must be met prior to entering the tankage, the system of Example I provides up to 10% higher volumetric yields than Control I and Control II, and 2% to 3% higher than Control VI.

As will be appreciated, the system of Example I allows closer proximity of the equipment and greater insulation of the final stages of separation than Controls I to V. Accordingly, heat loss in the lines is negligible due to the proximity of the equipment and insulation of the final stages of separation. Prior art systems, as represented by Controls I-V, have suffered from significant heat losses due to the necessity of locating direct heat treaters away from other tanks and process equipment. Accordingly, such systems have suffered from temperature losses of 30° F. or more in the lines/conduits from the heat treater to the storage tank. Unfortunately, these temperature losses result in a product that does not meet RVP requirements at both the time of entering the storage tank and leaving the storage tank. As will be appreciated by one skilled in the art based on a review of these examples and particularly Table 4, RVP requirements are met in prior art systems only by introducing significant process disadvantages. For example, in Controls I-V RSVP, requirements are met when the product is leaving the storage tank only by taking off significant gas (>0.1 MMscfd) from the tankage. Additionally, RVP for product entering the storage tank is met only by significantly increasing the heater duty, and then it is met only by sacrificing product yield; that is, product yields are significantly lowered (more than a 5% reduction and in some cases more than a 10% reduction). However, the current system eliminates these disadvantages. Use of an indirect heater instead of direct heating, and other process changes, virtually eliminate the heat loss in the lines from the heating to the storage tank. Even if heat losses occur in the current system, those losses only increase the duty required in the indirect heater but will not reduce product yield while meeting the same RVP specification. Accordingly, product yields remain the same for the current design and do not suffer due to temperature losses. As will be further appreciated, the current system allows for there to be no significant gas take off (<0.1 MMscfd) from the storage tank.

TABLE 4

| Property | Control I | Control II | Control III | Control IV | Control V | Control VI | Example I |
|---|---|---|---|---|---|---|---|
| Water produced (bbl/d) | 5971.4 | 5980.6 | 5955.2 | 5967.9 | 5967.9 | 5999.3 | 6004.1 |
| Heater Duty (MMBTU/hr) | 9.63 | 9.78 | 13.3 | 8.388 | 13.6 | 1.58 | 1.675 |
| Heater Outlet Temp (F.) | 144.65 | 156.27 | 183 | 131.99 | 166.25 | 108 | 111.73 |
| Assumed Line Losses (F) | −30 | −30 | −30 | −30 | −30 | 0 | 0 |

TABLE 4-continued

| Property | Control I | Control II | Control III | Control IV | Control V | Control VI | Example I |
|---|---|---|---|---|---|---|---|
| Tankage Product Temperature (F.) | 89.737 | 105.59 | 136.33 | 86.144 | 123.75 | 107.24 | 110.9 |
| RVP Entering Tankage (psi) | 16.6127 | 15.155 | 10.842 | 14.394 | 10.841 | 10.842 | 10.842 |
| RVP Exiting Tankage (psi) | 10.842 | 10.841 | 7.1503 | 10.841 | 6.7624 | 10.842 | 10.842 |
| Gas off in Tankage (MMscfd) | 0.33421 | 0.17174 | 0.13732 | 0.18349 | 0.14133 | 0 | 0 |
| Oil Product Flow (bbl/d) | 2516.2 | 2632.1 | 2398.6 | 2492.5 | 2190.7 | 2650.8 | 2702.9 |

While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Additionally, where the term "about" is used in relation to a range it generally means plus or minus half the last significant figure of the range value, unless context indicates another definition of "about" applies.

In addition, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A process, comprising:
    introducing a first fluid stream into a first separation zone at a first pressure and a first temperature, wherein the first fluid stream comprises a gas phase, an aqueous liquid phase and a hydrocarbon liquid phase and wherein the first pressure is at least 50 psig;
    separating a first gas stream from the first fluid stream in the first separation zone to produce a second fluid stream, wherein the separation of the first gas stream occurs at the first pressure;
    introducing the second fluid stream into a second separation zone;
    separating a second gas stream from the second fluid stream in the second separation zone to produce a third fluid stream, wherein the separation of the second gas stream takes place at near atmospheric pressure;
    indirectly heating the third fluid stream to a second temperature greater than the first temperature but below the saturation temperature of the aqueous liquid;
    introducing the thus heated third fluid stream to a third separation zone; and
    separating a third gas stream from the heated third fluid stream in the second separation zone to produce a fourth fluid stream.

2. The process of claim 1, wherein the separation in the first separation zone includes separating a first aqueous liquid stream from the first fluid stream.

3. The process of claim 1, wherein the separation in the second separation zone includes separating a first aqueous liquid stream from the second fluid stream.

4. The process of claim 1, further comprising reducing the second fluid stream from the first pressure to near atmospheric pressure prior to introducing the second fluid stream into the second separation zone.

5. The process of claim 4, wherein the step of reducing the second fluid stream to near atmospheric pressure increases a gas phase in the second fluid stream such that the second fluid stream has an increased gas concentration after the step of reducing than before the step of reducing.

6. The process of claim 1, further comprising pumping the third fluid stream to the indirect heater and thus elevating the third fluid stream to a pressure from TO psig to 30 psig.

7. The process of claim 1, wherein the step of indirectly heating the third stream increases the gas phase such that the heated third fluid stream has a higher concentration of gas than the third fluid stream prior to the step of indirectly heating.

8. The process of claim 1, wherein the fourth fluid stream comprises less than 1% by volume aqueous liquid and less than 1% by volume gas.

9. The process of claim 4, wherein the fourth fluid stream comprises less than 0.1% by volume aqueous liquid and less than 0.1% by volume gas.

10. The process of claim 1, wherein the first temperature is below 100° F., the first pressure is above 100 psig, and wherein the near atmospheric pressure is less than about 5 psig.

11. The process of claim 10, wherein the first temperature is from about 32° F. to below 100° F. and the second temperature is above 100° F.

12. The process of claim 1, further comprising:
    reducing the second fluid stream from the first pressure to the near atmospheric pressure prior to introducing the second fluid stream into the second separation zone, the reduction to near atmospheric pressure being such the gas phase increases so the second fluid stream has an increased gas concentration after the step of reducing than before the step of reducing; and
    pumping the third fluid stream to the indirect heater and thus elevating the third fluid stream to a pressure from 10 psig to 30 psig.

13. The process of claim 12, wherein:
    the separation in the first separation zone includes separating a first aqueous liquid stream from the first fluid stream;
    the step of indirectly heating the third stream increases the gas phase such that the heated third fluid stream has a higher concentration of gas than the third fluid stream prior to the step of indirectly heating;

the first temperature is from about 32° F. to below 100° F., the first pressure is above 100 psig, the near atmospheric pressure is less than about 5 psig, and the second temperature is above 100° F.; and the fourth fluid stream comprises less than 0.1% by volume aqueous liquid and less than 0.1% by volume gas.

* * * * *